US012601300B2

(12) United States Patent
Palmer et al.

(10) Patent No.: US 12,601,300 B2
(45) Date of Patent: Apr. 14, 2026

(54) GAS TURBINE ENGINE FUEL SYSTEM COMPRISING MULTIPLE FUEL HEATERS

(71) Applicant: ROLLS-ROYCE plc, London (GB)

(72) Inventors: Chloe J. Palmer, Derby (GB); Marko Bacic, Oxford (GB); Paul J. H. Harris, Derby (GB)

(73) Assignee: ROLLS-ROYCE plc, London (GB)

( * ) Notice: Subject to any disclaimer, the term of this patent is extended or adjusted under 35 U.S.C. 154(b) by 110 days.

(21) Appl. No.: 18/741,964

(22) Filed: Jun. 13, 2024

(65) Prior Publication Data

US 2025/0188869 A1      Jun. 12, 2025

(30) Foreign Application Priority Data

Jul. 5, 2023    (GB) ..................................... 2310324

(51) Int. Cl.
*F02C 7/224* (2006.01)
*F02C 3/22* (2006.01)
*F02C 7/228* (2006.01)

(52) U.S. Cl.
CPC ................. *F02C 7/224* (2013.01); *F02C 3/22* (2013.01); *F02C 7/228* (2013.01)

(58) Field of Classification Search
CPC .. F02C 7/22; F02C 7/224; F02C 7/228; F02C 3/20; F02C 3/22
See application file for complete search history.

(56) References Cited

U.S. PATENT DOCUMENTS

| | | |
|---|---|---|
| 3,705,496 A | 12/1972 | Wolf et al. |
| 4,942,733 A | 7/1990 | Hosford |
| 5,392,595 A | 2/1995 | Glickstein et al. |
| 6,079,222 A * | 6/2000 | Fetescu ..................... F17C 9/04 |
| | | 62/915 |
| 8,459,039 B2 | 6/2013 | Allam |
| 8,844,258 B2 | 9/2014 | Ekanayake et al. |
| 10,989,117 B2 * | 4/2021 | Roberge ................... F02C 3/22 |

(Continued)

FOREIGN PATENT DOCUMENTS

| | | |
|---|---|---|
| EP | 3978738 A1 | 4/2022 |
| EP | 4151529 A1 | 3/2023 |
| WO | 2021/257567 A1 | 12/2021 |

OTHER PUBLICATIONS

Nov. 20, 2023 Combined Search and Examination Report Issued in British Patent Patent Application No. GB2310324.5.

(Continued)

*Primary Examiner* — William H Rodriguez
(74) *Attorney, Agent, or Firm* — Oliff PLC

(57) ABSTRACT

A fuel system for a gas turbine engine includes a fuel offtake configured to divert a portion of hydrogen fuel from a main fuel conduit, a burner configured to burn the portion of hydrogen fuel diverted from the main fuel conduit and at least first and second heat exchangers. The first heat exchanger is configured to transfer heat from exhaust gasses produced by the burner to hydrogen fuel in the main fuel conduit and the second heat exchanger is provided upstream in hydrogen flow of the first heat exchanger and is configured to transfer heat from a further heat exchange fluid to hydrogen fuel in the main fuel conduit. In an embodiment, the further heat exchange fluid is compressor bleed air bled from a core compressor of the gas turbine engine.

11 Claims, 5 Drawing Sheets

(56)     References Cited

U.S. PATENT DOCUMENTS

| | | | | |
|---|---|---|---|---|
| 11,041,439 | B2 * | 6/2021 | Roberge | F02C 7/224 |
| 11,753,995 | B1 | 9/2023 | Owoeye et al. | |
| 2012/0096869 | A1 | 4/2012 | Kesseli et al. | |
| 2020/0088102 | A1 * | 3/2020 | Roberge | F02C 7/224 |
| 2021/0340908 | A1 * | 11/2021 | Boucher | F02C 7/224 |
| 2021/0348561 | A1 * | 11/2021 | Cocks | F02C 7/12 |
| 2022/0297844 | A1 * | 9/2022 | Mackin | B64D 35/023 |
| 2022/0364505 | A1 | 11/2022 | Kim et al. | |
| 2022/0381185 | A1 * | 12/2022 | Muldoon | F02C 7/32 |
| 2023/0083470 | A1 | 3/2023 | Ranjan et al. | |
| 2023/0194097 | A1 | 6/2023 | Hart et al. | |
| 2023/0375176 | A1 * | 11/2023 | Owoeye | F02C 7/224 |
| 2023/0391467 | A1 * | 12/2023 | Palmer | H01M 8/04014 |
| 2024/0360788 | A1 * | 10/2024 | Evans | F02C 3/22 |
| 2025/0020081 | A1 * | 1/2025 | Rimmer | F02C 7/228 |
| 2025/0067218 | A1 * | 2/2025 | Coulson | B64D 37/02 |
| 2025/0084793 | A1 * | 3/2025 | Sibbach | F01K 23/10 |

OTHER PUBLICATIONS

Nov. 17, 2023 Combined Search and Examination Report Issued in British Patent Patent Application No. GB2310325.2.

U.S. Appl. No. 18/741,985, filed Jun. 13, 2024 in the name of Rimmer et al.

Nov. 13, 2024 Extended Search Report issued in European Patent Application No. 24180187.7.

Nov. 13, 2024 Extended Search Report issued in European Patent Application No. 24180189.3.

* cited by examiner

GAS TURBINE ENGINE FUEL SYSTEM COMPRISING MULTIPLE FUEL HEATERS

TECHNICAL FIELD

This disclosure relates to fuel systems for hydrogen-fuelled aero gas turbine engines.

BACKGROUND

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or as a liquid. Such fuel requires heating prior to delivery to the gas turbine, both to permit combustion, and to prevent icing. As such, the applicant has filed patent application EP 3978738 directed to a pre-heater for heating hydrogen gas using an auxiliary combustor utilising a portion of the hydrogen fuel, and air bled from the gas turbine engine.

However, operation of the pre-heater significantly reduces efficiency of the gas turbine engine, resulting in an increase in specific fuel consumption of several percent. The present disclosure seeks to provide an improved system, having greater efficiency.

SUMMARY

The invention is directed towards a fuel system for a gas turbine engine, the fuel system having a hydrogen fuel heater for heating cryogenically-stored hydrogen fuel prior to injection into gas turbine engines, and methods of operating such fuel systems and gas turbine engines.

In a first aspect, one such fuel system comprises:
- a fuel offtake configured to divert a portion of hydrogen fuel from a main fuel conduit;
- a burner configured to burn the portion of hydrogen fuel diverted from the main fuel conduit;
- at least first and second heat exchangers; wherein
- the first heat exchanger is configured to transfer heat from exhaust gasses produced by the burner to hydrogen fuel in the main fuel conduit; and
- the second heat exchanger is provided upstream in hydrogen flow of the first heat exchanger, and is configured to transfer heat from a further heat exchange fluid to hydrogen fuel in the main fuel conduit.

The inventors have found that the large temperature difference between burner exhaust gasses and hydrogen fuel may result in large thermal stresses in the heat exchanger. As such, the invention provides an arrangement in which the hydrogen is heated in stages, thereby reducing thermal stresses. Additionally, by reducing the heat addition requirement from the burner, a leaner air-fuel ratio can be employed. This may reduce emissions of Nitrides of Oxygen (NOx) from the burner, and also reduces flame temperatures, which may positively impact component life. Additional advantages of the invention are also provided, which are discussed in further detail below.

The fuel system may be configured such that, in use, the further heat exchange fluid may have a lower temperature at entry to the second heat exchanger than burner exhaust gasses at entry to the first heat exchanger. Consequently, the temperature difference between the hydrogen fuel and both the exhaust gases and the further heat exchange fluid is reduced.

The further heat exchange fluid may comprise compressed air provided from a compressor bleed of a gas turbine engine. Advantageously, compressor bleed air will be at a lower temperature than exhaust gases from the burner, and so temperature differences between the hydrogen fuel and the heat exchange fluids are reduced.

The burner may be configured to burn hydrogen fuel with air from the compressor bleed. Advantageously, the compressor bleed has multiple functions (direct heating of the hydrogen fuel, and provision of pressurised air for combustion in the burner), thereby increasing utility of the compressor bleed.

The second heat exchanger may be configured to cool the compressor bleed air to a temperature above 273K at an outlet of the second heat exchanger. Advantageously, ice formation in the second heat exchanger from humidity in the compressor bleed air is prevented.

The fuel system may comprise an exhaust mixer configured to mix compressor bleed outlet air from the second heat exchanger with exhaust gases from an outlet of the first heat exchanger. Advantageously, waste heat from the system is reduced, thereby increasing system efficiency. Additionally, excess thrust and flow velocity is reduced, thereby minimising exhaust noise.

The fuel system may comprise a third heat exchanger provided downstream of the second heat exchanger and upstream of the first heat exchanger in hydrogen fuel flow and configured to exchange heat between exhaust gasses from the burner, downstream of the second heat exchanger, and hydrogen in the main fuel conduit. Advantageously, a further reduction in temperature differences across the heat exchangers can be achieved.

The burner may comprise a first hydrogen fuel inlet configured to receive hydrogen fuel from an outlet of the first heat exchanger. Advantageously, the burner is self-sustaining, with heated hydrogen for the burner being provided by waste heat generated by the burner itself.

The burner may comprise a second hydrogen fuel inlet configured to receive hydrogen fuel from an outlet of the second heat exchanger. Advantageously, fuel heated by compressor air is available, which may assist with starting of the burner.

The second hydrogen fuel inlet may comprise an auxiliary fuel heater such as an electric fuel heater.

In a second aspect, there is provided a gas turbine engine comprising a fuel system according to the first aspect.

In a third aspect there is provided a method of providing heated hydrogen fuel to a hydrogen fuelled gas turbine engine, the method comprising:
- providing a fuel offtake configured to divert a portion of hydrogen fuel from a main fuel conduit;
- providing a burner configured to burn the portion of hydrogen fuel diverted from the main fuel conduit;
- providing at least first and second heat exchangers;
- diverting hydrogen fuel from the main fuel conduit to the burner, and exchanging heat between burner exhaust gases and the hydrogen fuel in the first heat exchanger to thereby heat hydrogen fuel in the main fuel conduit; and
- diverting compressor air from the gas turbine engine to the second heat exchanger, and exchanging heat between bled compressor air and the hydrogen fuel in the second heat exchanger to thereby heat hydrogen fuel in the main fuel conduit; wherein
- the first heat exchanger is provided downstream in hydrogen fuel flow of the second heat exchanger.

In a fourth aspect there is provided a fuel system for a hydrogen fuelled gas turbine engine, the fuel system comprising:

a fuel offtake configured to divert a portion of hydrogen fuel from a main fuel conduit;

a burner configured to burn the portion of hydrogen fuel diverted from the main fuel conduit;

a first heat exchanger configured to transfer heat from exhaust gasses produced by the burner to hydrogen fuel in the main fuel conduit; wherein the fuel offtake is provided downstream in hydrogen fuel flow of the first heat exchanger.

The inventors have found that, during operation, the temperature of hydrogen fuel from the first heat exchanger is sufficient to provide operation of both a main gas turbine engine core combustor, and the burner combustor, such that the burner is self-sustaining in use, and a single heat exchanger can be provided in the system, greatly simplifying operation. Additional features and advantages of the disclosed arrangement are discussed below.

The burner may be configured to burn hydrogen fuel with air from a compressor bleed of the gas turbine engine. Advantageously, the compressor bleed has multiple functions (direct heating of the hydrogen fuel, and provision of pressurised air for combustion in the burner), thereby increasing utility of the compressor bleed.

The fuel system may comprise a second hydrogen fuel offtake upstream in hydrogen fuel flow of the first heat exchanger configured to divert a portion of hydrogen fuel from the main fuel conduit to the burner.

The second hydrogen fuel offtake may comprise an auxiliary fuel heater such as an electric fuel heater.

The fuel system may comprise a second heat exchanger provided upstream in hydrogen fuel flow of the first heat exchanger, and configured to exchange heat with a second heat exchange fluid.

The fuel system may be configured such that, in use, the further heat exchange fluid may have a lower temperature at entry to the second heat exchanger than burner exhaust gasses at entry to the first heat exchanger. Consequently, the temperature difference between the hydrogen fuel and both the exhaust gases and the further heat exchange fluid is reduced.

The further heat exchange fluid may comprise compressed air provided from a compressor bleed of a gas turbine engine. Advantageously, compressor bleed air will be at a lower temperature than exhaust gases from the burner, and so temperature differences between the hydrogen fuel and the heat exchange fluids is reduced.

The second heat exchanger may be configured to cool the compressor bleed air to a temperature above 273K at an outlet of the second heat exchanger. Advantageously, ice formation in the second heat exchanger from humidity in the compressor bleed air is prevented.

The fuel system may comprise an exhaust mixer configured to mix compressor bleed outlet air from the second heat exchanger with exhaust gases from an outlet of the first heat exchanger. Advantageously, waste heat from the system is reduced, thereby increasing system efficiency. Additionally, excess thrust and flow velocity is reduced, thereby minimising exhaust noise.

The fuel system may comprise a third heat exchanger provided downstream of the second heat exchanger and upstream of the first heat exchanger in hydrogen fuel flow and configured to exchange heat between exhaust gasses from the burner, downstream of the second heat exchanger, and hydrogen in the main fuel conduit. Advantageously, a further reduction in temperature differences across the heat exchangers can be achieved.

The second fuel offtake may be configured to receive hydrogen fuel from an outlet of the second heat exchanger. Advantageously, fuel heated by compressor air is available, which may assist with starting of the burner.

In a fifth aspect, there is provided a method of starting a gas turbine engine according to the fourth aspect, comprising:

flowing gaseous hydrogen through the main fuel conduit, first heat exchanger, fuel offtake and burner;

igniting the gaseous hydrogen in the burner to produce heated burner exhaust gases, and flowing these gases through the first heat exchanger; and, subsequently:

flowing chilled hydrogen through the main fuel conduit and first heat exchanger; and starting the main gas turbine engine combustor using the hydrogen flowed through the first heat exchanger.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
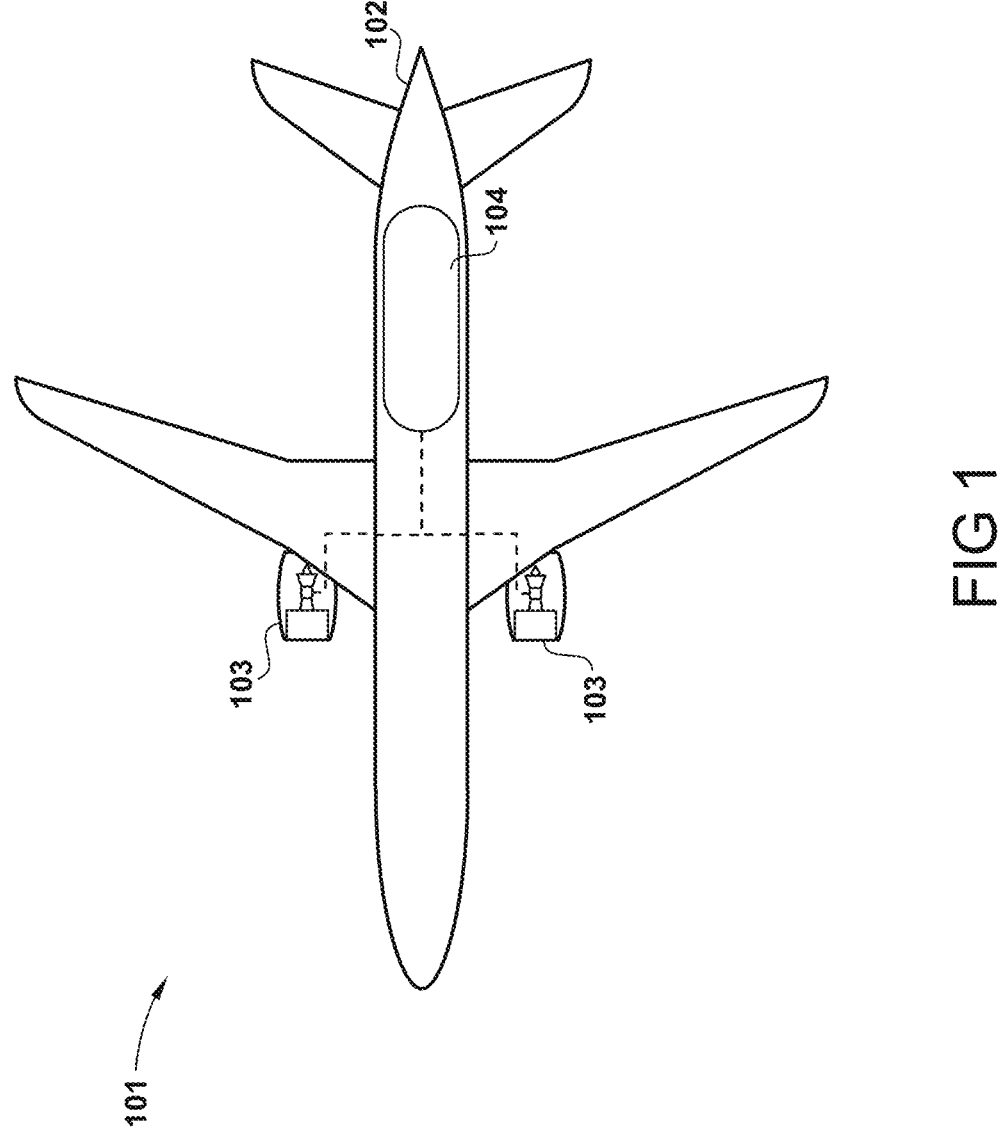
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103.

A hydrogen storage tank 104 is located in the fuselage 102. In the present embodiment, the hydrogen storage tank 104 is a cryogenic hydrogen storage tank and thus stores the hydrogen fuel in a liquid state, in a specific example at 22 Kelvin. In this example, the hydrogen fuel is pressurised to a pressure from around 1 bar to around 5 bar, in a specific example 4 bar. Alternatively, the hydrogen storage tank could store hydrogen fuel in a sub-cooled, high pressure gaseous or supercritical state.

Figure 2:
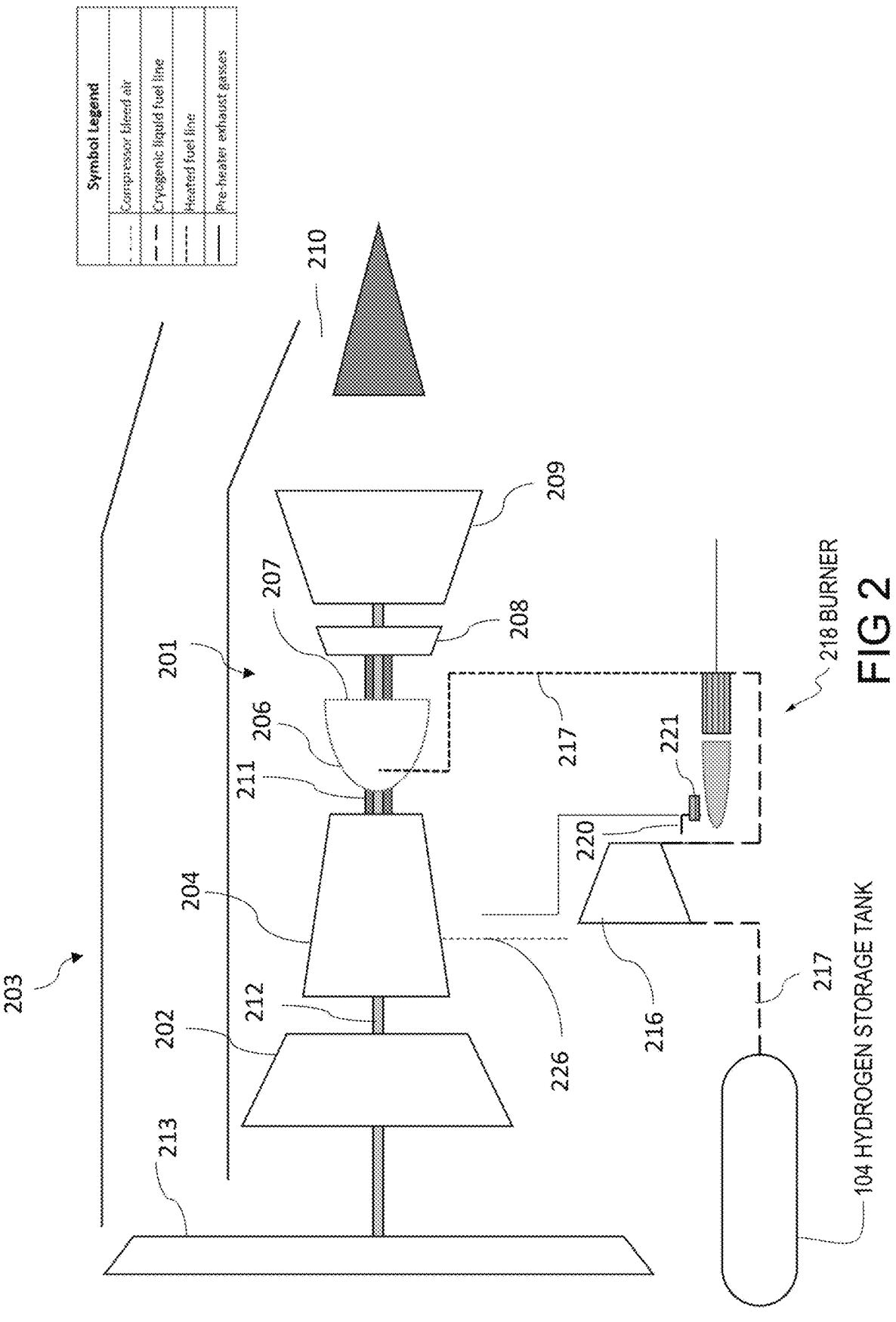
FIG. 2 is a block diagram of one of the engines of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a core gas turbine combustion system 206, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212.

In operation, the low-pressure turbine 209 drives a fan 213 via shaft 212. It will be appreciated that in alternative embodiments, the core gas turbine could be of three-shaft configuration, and/or could comprise a reduction gearbox between the low-pressure turbine and fan.

In operation, hydrogen fuel is pumped from the hydrogen storage tank 104 by a pump 216 and into a main fuel conduit 217 which ultimately delivers fuel to the fuel injection system 206. The pump may be driven by an electric machine or via one or more of the gas turbine engine core shafts 211, 212 via an auxiliary gearbox (not shown).

As will be appreciated, it is desirable to increase the temperature of the fuel from the 22 Kelvin cryogenic storage condition to a temperature much closer to the firing temperature of the core gas turbine 201; of course this is subject to the constraint of not exceeding the autoignition temperature of the hydrogen fuel prior to admission into the combustor 207. Where the fuel is stored as a supercritical fluid or gas, the storage temperature will be higher, but will typically still be significantly below the freezing point of water (273 Kevin, i.e. at cryogenic temperatures). In an example, the injection temperature is from 250 to 300 kelvin, for example 250 kelvin. In some cases, it may be desirable to increase the fuel temperature to above an icing temperature, such as 273 Kelvin.

In the present embodiment, a heater 218 is therefore provided for heating of the hydrogen fuel, and possibly to implement a phase change where the hydrogen is stored as a liquid. In the present embodiment, this takes place between the pump 216 and the gas turbine engine core combustion 206. In an embodiment, the heater 218 is configured to raise the temperature of the hydrogen fuel to the required injection temperature.

Figure 3:
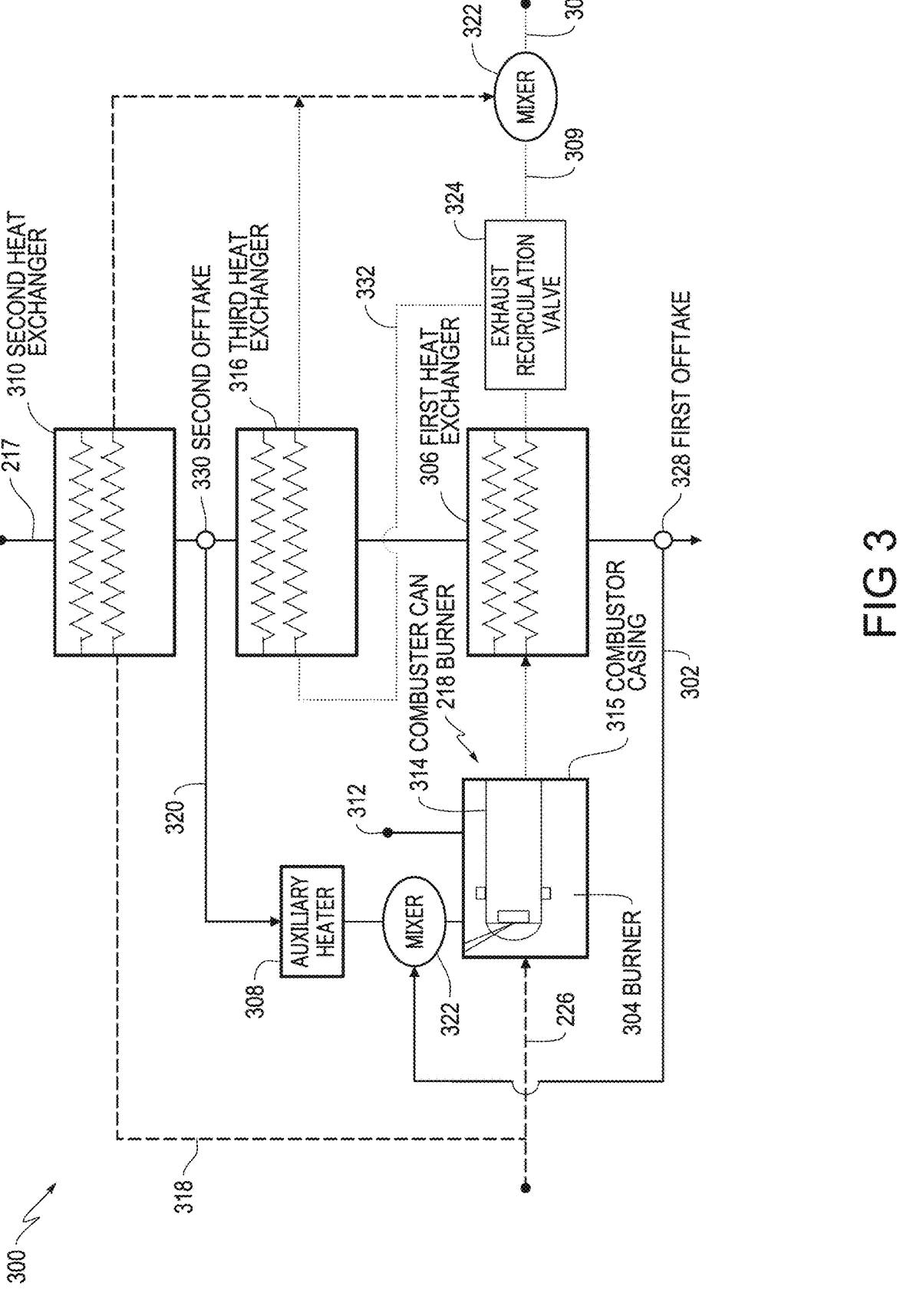
FIG. 3 is a block diagram of part of a first configuration of a fuel system for the engine of FIG. 2.

The heater 218 is part of a fuel system 300 for the gas turbine engine, which is shown in further detail in FIG. 3. The burner 218 comprises first and second offtakes 302, 320 configured to divert a portion of the hydrogen fuel from the main fuel conduit 217. The amount of hydrogen bled from the main fuel conduit 217 is controlled by a valve 322. In an embodiment, the valve 322 is controlled actively, for example in response to the temperature of the fuel at gas turbine engine core combustor 206. Alternatively, the valve may be passively controlled. In operation, of the order of around 1 percent of the hydrogen fuel flow through the main fuel conduit 217 is bled for use in the heater 218.

As described previously, hydrogen has very high specific and latent heat capacities; however as a gas it has a very low molecular weight and density, and thus it can be challenging to exchange heat in a compact way. Thus, the heater 218 heats the hydrogen fuel in the main fuel conduit 217 by combustion of the bled fuel in a burner 304 located in heat exchange relationship with the main fuel conduit 217 via first, second, and, optionally, third, heat exchangers 306, 310, 316. As will be understood, fuel for the burner 304 must also be provided at an acceptable temperature, and a smaller auxiliary fuel heater 308 may be provided for this.

It should be understood that, in the present example, the products of combustion from the burner 222 are not mixed with the fuel in the main fuel conduit 217. In this respect, the pre-heater 218 therefore differs from a pre-burner system as used in staged combustion cycle rocket engines.

In order to reduce the volume of the burner 218, it is desirable to use a high-pressure source of air, which provides sufficient mass-flow in a small volume to combust the hydrogen fuel. As such, air for combustion with the bled hydrogen fuel is bled from a compressor of the gas turbine engine core, and in this embodiment, from the high-pressure compressor 204. Air is bled from the high-pressure compressor 204 from a compressor bleed 226 (shown in FIG. 2). Alternatively, air may be bled from the low-pressure compressor 202.

The burner 304 itself receives heated hydrogen fuel from the first and second offtakes 302, 320, and optionally from the auxiliary heater 308. This hydrogen is combined with compressed air from the compressor bleed 226 and combusts this combined gas flow to generate a heated exhaust gas flow which exits via an exhaust 309. An ignitor such as an electric spark ignitor 312 may be provided to initially ignite the fuel/air mix. The combustor is typically of a "can" type construction, having a central flame tube surrounded by a combustor casing 315. Air and fuel flows into the combustor can 314 where combustion takes place, while cooling air flows within the combustor casing 315, and is introduced into the combustor can 314 through dilution holes (not shown). Alternatively, a "micromix" style injector may be used, in which air and fuel are provided in small holes provided in an injector plate.

FIG. 3 illustrates the various flows of hydrogen fuel (shown by the solid lines), compressed air (shown by the dashed lines) and exhaust gases (shown by the dotted lines) within a fuel system 300 of the gas turbine engine 203.

The first heat exchanger 306 is positioned downstream of the burner 304 in exhaust gas flow, and is configured to exchange heat between hydrogen fuel in the hydrogen fuel line 217, and exhaust gases from the burner 304.

The first heat exchanger 306 is provided downstream in hydrogen fuel flow of the second heat exchanger 310, and optionally, the third heat exchanger 316. As such, hydrogen fuel flows in use first to the second heat exchanger 310, then to the third heat exchanger 316, and finally to the first heat exchanger 306.

The second heat exchanger 310 is configured to exchange heat between hydrogen in the hydrogen fuel line 217 and a further heat exchange fluid. In the present embodiment, the further heat exchange fluid is compressed air, provided from the gas turbine engine compressor 202, 204, via an offtake line 318 from the bleed air line 226. Cooled compressor air downstream of the second heat exchanger in compressed air flow is combined with exhaust gases from the first heat exchanger 306 in a mixer 322. In alternative embodiments, the further heat exchange fluid could comprise a suitable, low temperature heat exchange fluid, such as helium. In such a system, a further heat exchanger (not shown) may be provided to heat the further heat exchange medium once it is cooled by heat exchange with hydrogen in the second heat exchanger 310, before returning the heat exchange medium back to the second heat exchanger 310 in a closed loop.

Each of the first, second and third heat exchangers 306, 310, 316 are typically arranged as "cross-flow" heat exchangers, with the heat exchange fluids flowing at substantially 90 degrees to one another. However, such an arrangement can result in high temperature differentials at some parts of the heat exchangers.

In order to reduce these temperature differentials, the optional third heat exchanger 316 is provided downstream of the first heat exchanger 306 in burner exhaust gas flow, and downstream of the second heat exchanger 310 and upstream of the first heat exchanger 306 in hydrogen fuel flow. The third heat exchanger 316 is configured to exchange heat between the heated hydrogen fuel in the hydrogen fuel line 217, downstream of the second heat exchanger 310 in hydrogen fuel flow, and cooled exhaust gases from downstream of the first heat exchanger 306 in burner exhaust gas flow.

As such, hydrogen within the fuel line 217 is heated, and heat exchange fluids are cooled, in a multi-step process. In an alternative embodiment, the third heat exchanger 306 may be omitted, and the heat exchangers 306 and/or 310 may comprise "counter-flow" heat exchangers, configured to flow heat exchange fluids in substantially opposite directions within the heat exchange matrix.

In a first step, hydrogen is heated by the second heat exchange 310 by compressed air from the gas turbine engine compressor 202, 204. Typically, where the hydrogen is provided in a liquid state from the tank 104, this heating step also provides a phase change, such that liquid hydrogen is gasified within the second heat exchanger 310. Typically, the temperatures are carefully managed within this heat exchange step to satisfy several conditions.

It is desirable to avoid contact between hydrogen and compressed air, particularly where one or both of the gases are at or above an auto-ignition temperature. Under normal operation, the compressed air in the air line 318 and fuel in the fuel line 217 are kept separate within the second heat exchanger 310. However, in the event of a leak, these fluids may contact one another. In order to reduce fire risk, the heat exchanger flow rates and geometries are configured such that neither the compressed air nor the hydrogen is provided at a temperature higher than 510° C. within the heat exchanger.

As the hydrogen within the second heat exchanger 310 is heated by the compressed air, the compressed air within the air line 318 is cooled. It is desirable to maintain the compressed air within the air line at a temperature above the freezing point of water, to prevent icing within the air line 318.

These two conditions each provide upper limits on the amount of heat exchange that can take place in the second heat exchanger 310. Furthermore, heating of the fuel in the fuel line 217 using compressed air is relatively inefficient from a total aircraft propulsion system point of view, since a significant amount of work must be done to compress the air. Consequently, the second heat exchanger may transfer less heat to the fuel than either the first or third heat exchangers 306, 316.

In a second step, hydrogen is heated by the optional third heat exchanger 316 by heat exchange with cooled exhaust gasses, from downstream of the first heat exchanger 306. In this step, the hydrogen fuel within the fuel line is typically in a gaseous state, and at a higher temperature, and so may be susceptible to combustion. However, the exhaust gases within the third heat exchanger are at a relatively low temperature, typically below the autoignition temperature of hydrogen, and are relatively low in oxygen content, due to the combustion in the burner 304. As such, fire risk is reduced in the event of leakage within the heat exchanger 316. The provision of the third heat exchanger 316 also increases overall heat exchange for a given exhaust gas temperature emanating from the burner 304. This in turn allows for lower exhaust gas temperatures for a given hydrogen flow and temperature requirement, thereby permitting leaner air-fuel mixtures, and potentially therefore, low NOx emissions. Improved component life may also be provided, in view of the lower temperatures.

In a third step, the hydrogen in the fuel line 217 is heated by the first heat exchanger 306. At this stage, the hydrogen has been heated twice, and is at relatively high temperatures. However, the exhaust gases within the exhaust line 309 are at their highest temperatures, as they have not been cooled yet by a heat exchanger. As such, a sufficient temperature difference is available for efficient heat exchange, while the temperature difference is also sufficiently small that large thermal stresses do not occur.

As will be recognised, the provision of two, and, optionally, three, heat exchangers 306, 310, 316 allows for efficient heat exchange, while maintaining a relatively low temperature differential across each stage of heat exchange. The process can also involve separate phase change and heating steps, thereby allowing for easier design of the heat exchangers. Additionally, since two different heat exchange media (in this case, exhaust gases from the burner and heated compressed air) are utilised, control freedom is increased. For example, hydrogen temperature can be controlled by increasing fuel flow to the burner 304 to provide additional heat via the first heat exchanger 306 and optional third heat exchanger 316, which may be relatively efficient, but also relatively slow in releasing additional heat to the hydrogen. Separately, hydrogen temperature can be controlled by increasing compressed air flow to the second heat exchanger 310, which is less thermodynamically efficient, but may be more rapid. In practice, a control scheme is provided in which both of these heat exchange mechanisms can be used, in accordance with a desired output.

Still further control freedom can be provided by providing an optional exhaust recirculation valve 324. The exhaust recirculation valve 324 controls exhaust flow from an outlet of the first heat exchanger 306, to either the third heat exchanger 316 via a recirculation line 332, or an exhaust outlet. As such, heat exchange with the hydrogen fuel can be controlled by controlling exhaust gas flow to the third heat exchanger 316, thereby providing additional independent control over hydrogen temperature.

As will be understood, in order for the burner to combust hydrogen, fuel temperature control to the burner itself must also be provided. In the present embodiment, this is provided for in two separate ways.

Firstly, fuel is directly heated by the auxiliary heater 308.

Secondly, fuel temperature is controlled by fuel valve 322, which controls a proportion of fuel which is provided to the burner 304 from first 302 and second 320 fuel inputs.

The second fuel input 320 is in fluid communication with a second offtake 330 provided downstream in hydrogen fuel flow of the second heat exchanger 310. As such, hydrogen fuel from the second fuel input 320 is typically at least gasified, and partially heated by heating in the second heat exchanger 310. This fuel may be further heated by the auxiliary heater 308, which is provided in the first inlet 302, upstream of the valve 322.

Fuel from this source is gasified, but may be at a relatively low temperature. However, this fuel source can be used during startup, and should have a relatively stable temperature during operation. Consequently, control may be simplified.

The first fuel input 302 is in fluid communication with a first offtake 328, provided downstream in hydrogen fuel flow of the first heat exchanger 306. As such, hydrogen fuel at this location is at its highest temperature. By providing fuel from this offtake, use of the auxiliary heater 308 is minimised, thereby reducing electrical heating demand, and increasing overall thermal efficiency of the propulsion system. In some cases, the auxiliary heater 308 is used only for startup, where high temperature compressor air from the engine core is not yet available.

Figure 4:
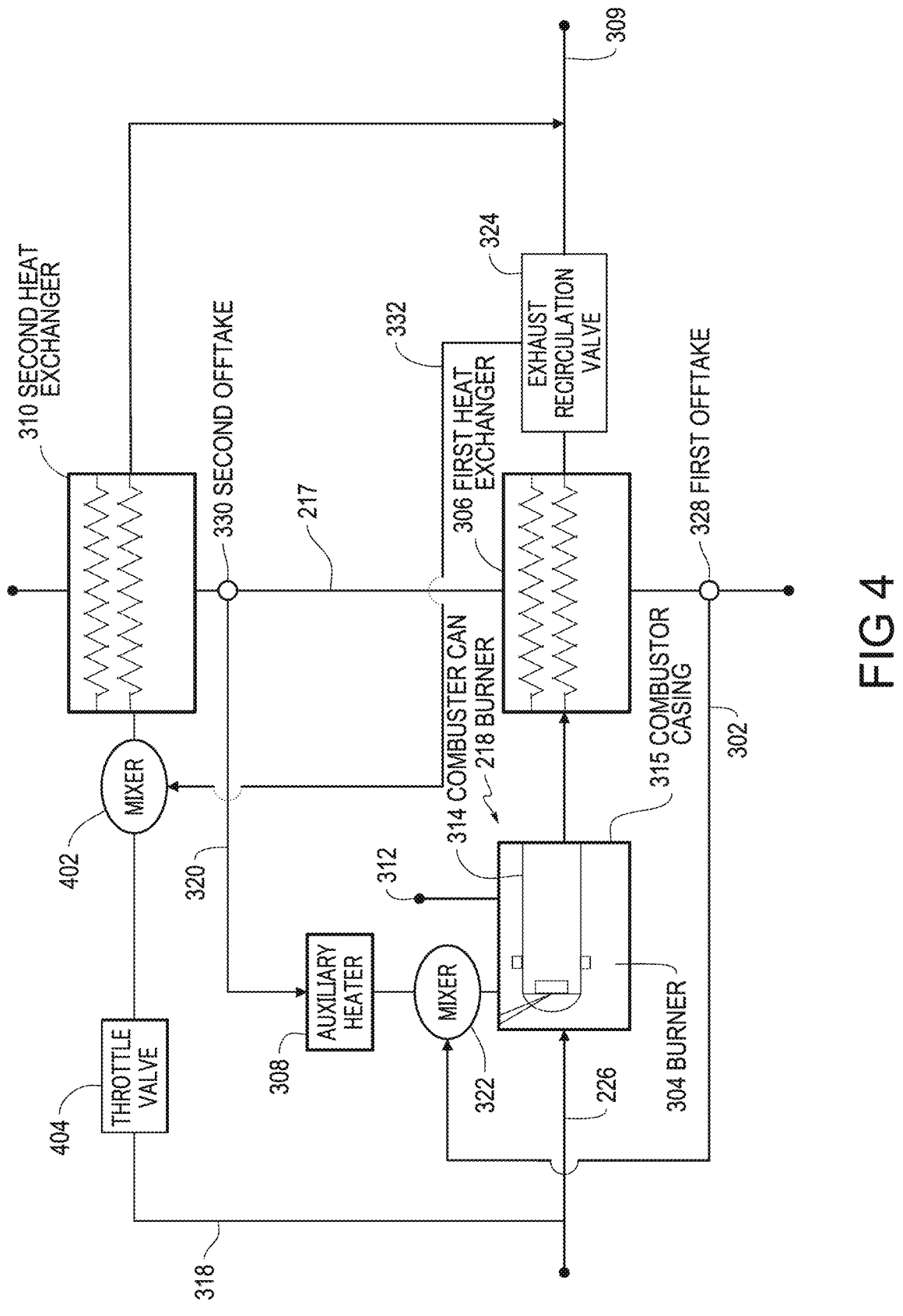
FIG. 4 shows a second configuration of a fuel system for the gas turbine engine of FIG. 2.

FIG. 4 shows an alternative fuel system 400.

The fuel system 400 is similar to the system 300, but omits the third heat exchanger 316. As such, hydrogen in the fuel line flows through the second heat exchanger 310, where heat is exchanged between hydrogen and compressed air in the compressed air line, then to the first heat exchanger 306, where heat is exchanged between hydrogen and exhaust gasses from the burner 304.

The fuel system 400 also comprises an exhaust gas recirculation system, though this differs from the system in fuel system 300.

A valve 324 is provided downstream of the first heat exchanger 306 in exhaust gas flow, and acts in a similar way to the valve 324 in the system of FIG. 3. However, instead of recirculating exhaust gas to a third heat exchanger, the exhaust gas is mixed with compressed air in a mixer 402. The mixed gas is flowed into the second heat exchanger 316, where it warms the hydrogen.

As such, the exhaust gases downstream of the first heat exchanger 316 are recirculated through a recirculation line 332, to provide additional heating of the hydrogen. When exhaust gases are recirculated, compressor bleed flow can be reduced, thereby permitting warming of the hydrogen fuel with reduced compressor bleed flow, which improves overall engine efficiency.

In order to ensure the exhaust gases flow toward the compressed air bleed, and not in the other direction, a throttle valve 404 or other pressure reduction means may be provided upstream of the mixer 402.

Figure 5:
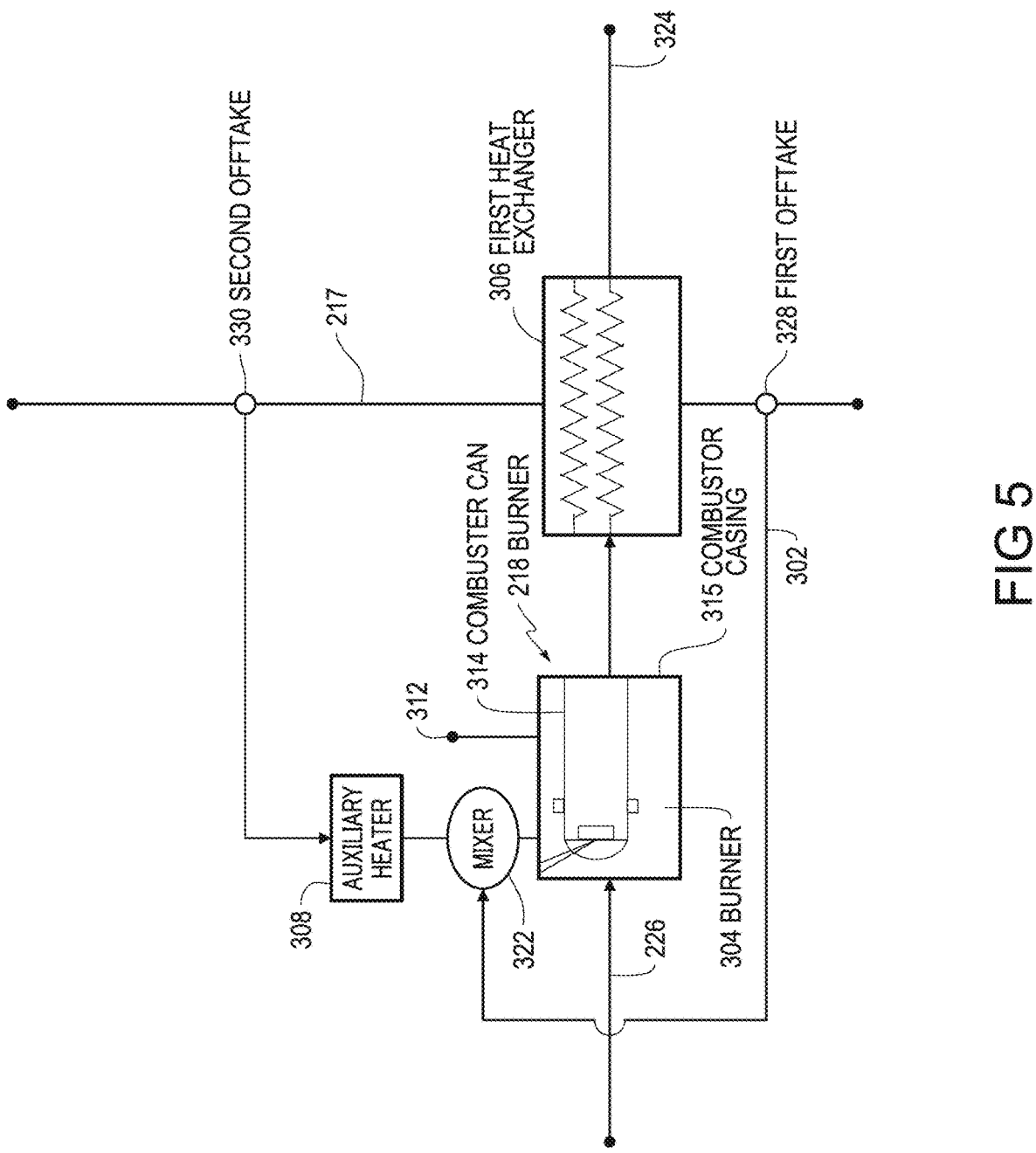
FIG. 5 shows a third configuration of a fuel system for the gas turbine engine of FIG. 2.

FIG. 5 shows a further embodiment.

In this embodiment, the fuel system comprises a single heat exchanger 306, which is similar to the heat exchanger 306 of the first and second embodiments, and is configured to exchange heat between hydrogen fuel flow from the main fuel conduit 217, and exhaust gases from the burner 218.

First and second fuel offtakes 328, 330 are again provided, with the first offtake being provided downstream of the heat exchanger 306 in hydrogen fuel flow, and the second offtake 330 being provided upstream of the heat exchanger 306 in hydrogen fuel flow.

As will be understood, where a single heat exchanger 306 is provided, hydrogen from the second, upstream offtake will be in the form of a liquid, or a low temperature gas as the case may be, depending on tank storage conditions. As such, operation of the heater 308 is required, in order to enable the gas to be raised to a temperature suitable for combustion, where hydrogen is provided to the burner 218 from this offtake.

On the other hand, hydrogen from the first offtake 328, downstream in hydrogen fuel flow of the heat exchanger 306 is at a temperature suitable for combustion, since this fuel is intended to be supplied to the main gas turbine engine combustor 206. As such, additional heating is not required, and operation is simplified, with improved efficiency.

The second offtake 330 may only be used for starting, or during transient conditions. However, the inventors have found that, in some cases, the second offtake 330 and auxiliary heater 308 may be omitted entirely.

This is made possible by an engine starting procedure in which the fuel conduit 217 is first purged by gaseous, relatively warm hydrogen during a chilldown procedure, prior to main engine starting by flowing gaseous hydrogen through the main fuel conduit 217, heat exchanger 306, fuel offtake 328 and burner 218. As such, relatively high temperature hydrogen is available within the hydrogen fuel conduit 217 during starting, making hydrogen fuel heating during starting unnecessary. In some cases, the gaseous hydrogen may be supplied from the liquid hydrogen tank 104, and warmed by passage through the system by the relatively warm components. Alternatively, a separate gaseous hydrogen source may be provided for purging.

Once the purging step has been completed, the burner 218 can be started by igniting the gaseous hydrogen, thereby transmitting heat to the heat exchanger 306. This then permits chilled (gaseous or liquid) hydrogen from the main fuel tank 104 to be flowed into the main fuel conduit 217, to be heated by heat exchange with exhaust gases in the heat exchanger. Heated fuel from the heat exchanger can then be flowed to the main gas turbine engine combustor 206, and the main gas turbine engine can be started.

As such, the burner can be started on warm hydrogen during the chilldown procedure, prior to liquid or cryogenic gaseous or supercritical hydrogen being flowed down the fuel conduit 217, subsequent to the chilldown procedure. As such, the disclosure provides a greatly simplified, highly efficient method of starting, and apparatus for fuel temperature control.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A fuel system for a hydrogen fuel gas turbine engine, the fuel system comprising:
   a fuel offtake configured to divert a portion of hydrogen fuel from a main fuel conduit;
   a burner configured to burn the portion of hydrogen fuel diverted from the main fuel conduit;
   a first heat exchanger configured to transfer heat from exhaust gases produced by the burner to hydrogen fuel in the main fuel conduit,
   wherein the fuel offtake is provided downstream in hydrogen fuel flow of the first heat exchanger; and
   a second hydrogen fuel offtake upstream in hydrogen fuel flow of the first heat exchanger configured to divert a portion of hydrogen fuel from the main fuel conduit to the burner, wherein the second hydrogen fuel offtake comprises an auxiliary fuel heater.

2. The fuel system according to claim 1, wherein the burner is configured to burn hydrogen fuel with air from a compressor bleed of a gas turbine engine.

3. The fuel system according to claim 1, wherein the fuel system comprises a second heat exchanger provided upstream in hydrogen fuel flow of the first heat exchanger, and configured to exchange heat with a second heat exchange fluid.

4. The fuel system according to claim 3, wherein, the fuel system is configured such that, in use, the second heat exchange fluid has a lower temperature at entry to the second heat exchanger than burner exhaust gases at entry to the first heat exchanger.

5. The fuel system according to claim 4, wherein the fuel system comprises an exhaust mixer configured to mix compressor bleed outlet air from the second heat exchanger with exhaust gases from an outlet of the first heat exchanger.

6. The fuel system according to claim 3, wherein the second heat exchange fluid comprises compressed air provided from a compressor bleed of a gas turbine engine.

7. The fuel system according to claim 6, wherein the second heat exchanger is configured to cool the compressor bleed air to a temperature above 273K at an outlet of the second heat exchanger.

8. The fuel system according to claim 3, wherein the fuel system comprises a third heat exchanger provided downstream of the second heat exchanger and upstream of the first heat exchanger in hydrogen fuel flow and configured to exchange heat between exhaust gases from the burner downstream of the second heat exchanger, and hydrogen in the main fuel conduit.

9. The fuel system according to claim 1, wherein the fuel system comprises a second heat exchanger provided upstream in hydrogen fuel flow of the first heat exchanger, and configured to exchange heat with a second heat exchange fluid, and wherein the second fuel offtake is configured to receive hydrogen fuel from an outlet of the second heat exchanger.

10. A gas turbine engine comprising a fuel system according to claim 1.

11. A method of starting a gas turbine engine according to claim 10, comprising:

flowing gaseous hydrogen through the main fuel conduit, first heat exchanger, fuel offtake and burner;

igniting the gaseous hydrogen in the burner to produce heated burner exhaust gases, and flowing these gases through the first heat exchanger; and, subsequently:

flowing chilled hydrogen through the main fuel conduit and first heat exchanger; and starting a main gas turbine engine combustor using the hydrogen flowed through the first heat exchanger.

\* \* \* \* \*